US012664439B2

(12) United States Patent
Feng et al.

(10) Patent No.: US 12,664,439 B2
(45) Date of Patent: Jun. 23, 2026

(54) SINGLE-FRAME FRINGE PATTERN ANALYSIS METHOD BASED ON MULTI-SCALE GENERATIVE ADVERSARIAL NETWORK

(71) Applicant: Nanjing University of Science and Technology, Nanjing (CN)

(72) Inventors: Shijie Feng, Nanjing (CN); Qian Chen, Nanjing (CN); Chao Zuo, Nanjing (CN); Yuzhen Zhang, Nanjing (CN); Jiasong Sun, Nanjing (CN); Yan Hu, Nanjing (CN); Wei Yin, Nanjing (CN); Jiaming Qian, Nanjing (CN)

(73) Assignee: NANJING UNIVERSITY OF SCIENCE AND TECHNOLOGY, Nanjing (CN)

( * ) Notice: Subject to any disclaimer, the term of this patent is extended or adjusted under 35 U.S.C. 154(b) by 960 days.

(21) Appl. No.: 17/909,780

(22) PCT Filed: Aug. 27, 2020

(86) PCT No.: PCT/CN2020/111544
§ 371 (c)(1),
(2) Date: Sep. 7, 2022

(87) PCT Pub. No.: WO2021/184686
PCT Pub. Date: Sep. 23, 2021

(65) Prior Publication Data

US 2023/0122985 A1 Apr. 20, 2023

(30) Foreign Application Priority Data

Mar. 20, 2020 (CN) ........................ 202010199717.9

(51) Int. Cl.
*G06N 3/094* (2023.01)
*G06N 3/0475* (2023.01)
(Continued)

(52) U.S. Cl.
CPC ........... *G06N 3/094* (2023.01); *G06N 3/0475* (2023.01); *G06N 3/048* (2023.01); *G06V 10/454* (2022.01)

(58) Field of Classification Search
CPC ...... G06N 3/094; G06N 3/0475; G06N 3/048; G06N 3/045; G06N 3/0464; G06N 3/08;
(Continued)

(56) References Cited

U.S. PATENT DOCUMENTS

2019/0286950 A1* 9/2019 Kiapour ................ G06F 16/532
2020/0051303 A1 2/2020 Li et al.

FOREIGN PATENT DOCUMENTS

CN 1975321 A 6/2007
CN 110135366 A 8/2019
(Continued)

OTHER PUBLICATIONS

Fringe pattern analysis, Feng et al, Feb. 2019 (Year: 2019).*
International Search Report, issued in PCT/CN2020/111544, dated Dec. 24, 2020.

*Primary Examiner* — Jianxun Yang
(74) *Attorney, Agent, or Firm* — Birch, Stewart, Kolasch & Birch, LLP

(57) ABSTRACT

The invention discloses a single-frame fringe pattern analysis method based on multi-scale generative adversarial network. A multi-scale generative adversarial neural network model is constructed and a comprehensive loss function is applied. Next, training data are collected to train the multi-scale generative adversarial network. During the prediction, a fringe pattern is fed into the trained multi-scale network where the generator outputs the sine term, cosine term, and the modulation image of the input pattern. Finally, the arctangent function is applied to compute the phase. When the network is trained, the parameters of the network do not need to manually tune during the calculation. Since the input
(Continued)

of the neural network is only a single fringe pattern, the invention provides an efficient and high-precision phase calculation method for moving objects.

11 Claims, 2 Drawing Sheets

(51) Int. Cl.
*G06N 3/048* (2023.01)
*G06V 10/44* (2022.01)

(58) Field of Classification Search
CPC ...... G06V 10/454; G06V 10/82; G06V 10/42; G06T 7/0002
See application file for complete search history.

(56) References Cited

FOREIGN PATENT DOCUMENTS

| | | | |
|---|---|---|---|
| CN | 110487216 | A | 11/2019 |
| CN | 111461295 | A | 7/2020 |

* cited by examiner

SINGLE-FRAME FRINGE PATTERN ANALYSIS METHOD BASED ON MULTI-SCALE GENERATIVE ADVERSARIAL NETWORK

FIELD OF THE INVENTION

The invention belongs to the technosphere of optical measurement, in particular to a single-frame fringe pattern analysis method based on multi-scale generative adversarial network.

BACKGROUND OF THE INVENTION

With the development of computer technology, information technology and optoelectronic technology, optical 3D measurement technology has been developed rapidly. Optical 3D measurement technology is based on the modern optics and further integrates technologies such as optoelectronics, signal processing, image processing, computer graphics, pattern recognition, and so on. It uses optical images as a means to detect and transmit information. Its purpose is to extract useful signals from captured images and complete the reconstruction of 3D models. According to the illumination modes, optical 3D measurement technology is generally divided into two categories: passive 3D measurement and active 3D measurement. Passive 3D measurement technology estimates the distance from two-dimensional images acquired by one or more cameras to generate the 3D profile of the measured object. Generally, such methods have low measuring accuracy and are not suitable for industrial applications. Active 3D measurement technology uses the structured light illumination technology to project images that are encoded according to certain rules to the measured object. The encoding pattern(s) is deformed owing to the modulation of the object surface. Then, the deformed pattern is captured by a camera. The 3D shape of the object can be calculated by using the position between the camera and the projector, and the degree of the pattern deformation. Structured light illumination 3D measurement technology has attracted more and more attention because of its non-contact, high sensitivity, high accuracy, and high automation.

Fringe pattern analysis is an indispensable step in the implementation of structured light illumination 3D measurement. Its main purpose is to analyze and to obtain the phase information hidden in the fringe image that is related to the 3D contour of the target. According to the number of projected images, fringe pattern analysis methods are often divided into multi-frame method and single-frame method. The N-step phase-shifting method is a widely used method that applies the strategy of the multi-frame fringe image analysis. This method adds several constant phase by phase shifting into the phase component of the projected pattern, so as to obtain a series of phase-shifting images and solve the phase from these images (Chao Zuo, Lei Huang, Minliang Zhang, Qian Chen, and Anand Asundi. "Temporal phase unwrapping algorithms for fringe projection profilometry: A comparative review." Optics and lasers in engineering 85 (2016): 84-103). The advantages of this method are high accuracy and high fidelity to the phase details of the object. However, the disadvantage is that a series of fringe images have to be collected for analysis, so the efficiency is not high, and it is difficult to meet the requirement of 3D measurement of moving objects.

Compared with the multi-frame method, the single-frame method shows superior advantages in terms of the efficiency. This kind of methods carry out the phase encoding process by using a single fringe image, so only one image is used to decode the phase information. Fourier transform fringe image analysis is the most representative single-frame method (Mitsuo Takeda, Hideki Ina, and Seiji Kobayashi, "Fourier-transform method of fringe-pattern analysis for computer-based topography and interferometry," J. Opt. Soc. Am. 72, 156-160 (1982)). This method is based on spatial filtering and its principle is to use the phase information of light to encode the spatial height of the object. The phase is extracted by selecting the appropriate filter window in the frequency domain and filtering suitable frequency component. The 3D reconstruction is realized according to the mapping relationship between the phase and the height. Since the phase can be obtained by only one deformed fringe pattern, this method has the advantages of high efficiency and fast measurement speed, which is suitable for 3D measurement of dynamic and fast moving objects. However, the disadvantage of this method is that the accuracy is low and the fidelity of contour details is poor for complex surfaces. Based on the traditional Fourier transform fringe image analysis, the windowed Fourier transform fringe image analysis can retain the phase information of more details by introducing the windowed Fourier transform (Kemao Qian. "Two-dimensional windowed Fourier transform for fringe pattern analysis: principles, applications and implementations." Optics and Lasers in Engineering 45, no. 2 (2007): 304-317). However, its disadvantage is that its implementation is complex, where the adjustment of involved parameters is not easy, and the time cost of phase calculation is high.

SUMMARY OF THE INVENTION

The object of the invention is to provide a single-frame fringe pattern analysis method based on multi-scale generative adversarial network.

A technical solution for achieving the object of the invention is as follows: a single-frame fringe pattern analysis method based on multi-scale generative adversarial network, and the steps are as follows:

Step 1: A multi-scale generative adversarial neural network model is constructed and it involves a multi-scale image generator and an image discriminator.

Step 2: A comprehensive loss function L is constructed for the multi-scale generative adversarial neural network.

Step 3: The training data are collected to train the multi-scale generative adversarial network.

Step 4: During the prediction, a fringe pattern is fed into the trained multi-scale network where the generator outputs the sine term, cosine term, and the modulation image of the input pattern. Then, the arctangent function is applied to compute the phase.

Preferably, the mentioned multi-scale image generator includes four data processing paths of the same structure termed as (1) to (4). Each data processing path consists of a convolutional layer, 4 residual blocks, and a convolutional layer that is linearly activated.

Preferably, the input of the mentioned data processing path (4) is $I_4(x, y)$ whose image size is $$\frac{1}{8}H\times\frac{1}{8}W.$$

The input of the mentioned data processing path (3) is $I_3(x, y)$ and the output of the data processing path (4) which includes the sine term, the cosine term and the modulation image and their size is upsampled to $$\frac{1}{4}H \times \frac{1}{4}W.$$

The input of the mentioned data processing path (2) is $I_2(x, y)$ and the output of the data processing path (3) which includes the sine term, the cosine term and the modulation image and their size is upsampled to $$\frac{1}{2}H \times \frac{1}{2}W.$$

The input of the mentioned data processing path (1) is $I_1(x, y)$ and the output of the data processing path (2) which includes the sine term, the cosine term and the modulation image and their size is upsampled to H×W.

Preferably, the mentioned image discriminator is built by 6 residual blocks and a fully connected layer. They are connected sequentially. The last fully connected layer is activated by the sigmoid function.

Preferably, the mentioned comprehensive loss function L can be expressed as $$L = \alpha L_{image} + \beta L_{GAN}$$

where α and β are the weights, $L_{image}$ the loss function regarding the image content, and $L_{GAN}$ the adversarial loss function.

Compared with traditional methods, the present invention has the following advantages: (1) Compared with the multi-frame fringe image analysis method, the present invention only needs one fringe image as input, and can obtain phase information quickly and efficiently; (2) Compared with the representative single-frame method such as the Fourier transform fringe image analysis, the accuracy of the present invention is higher; (3) When the network is trained, parameters are fixed and do not need to set manually during the calculation, making the implementation easy.

DESCRIPTION OF THE PREFERRED EMBODIMENT

A single-frame fringe pattern analysis method based on multi-scale generative adversarial network can analyze a single fringe image and obtain high-precision phase information. The principle is as follows:

According to the fringe image analysis, the fringe image I(x, y) can be expressed as $$I(x, y) = A(x, y) + B(x, y)\cos[\phi(x, y)]$$

where (x, y) is the pixel coordinate, A(x, y) the background image, B(x, y) the modulation image, and ϕ(x, y) the phase to be calculated. The phase can be calculated by $$\phi(x, y) = actan\frac{M(x, y)}{D(x, y)} = actan\frac{\frac{1}{2}B(x, y)\sin\phi(x, y)}{\frac{1}{2}B(x, y)\cos\phi(x, y)}$$

Generally, ϕ(x, y) is called wrapped phase as it is discontinuous. It ranges from [−π,π].

According to the above formula for phase calculation, the fringe image is fed into the multi-scale generative adversarial network. Firstly, the network is trained to estimate the sine term that is $$M(x, y) = \frac{1}{2}B(x, y)\sin\phi(x, y),$$

the cosine term $$D(x, y) = \frac{1}{2}B(x, y)\cos\phi(x, y),$$

and the modulation image B(x, y). Then, the sine and cosine terms are substituted into the arctangent formula to calculate the phase ϕ(x, y). Although the modulation image B(x, y) does not directly participate in the phase calculation, it is calculated as an output of the neural network, which is helpful to constraining the training process of the neural network, and is thus beneficial to improving the accuracy of the estimated sine and cosine terms.

Figure 1:
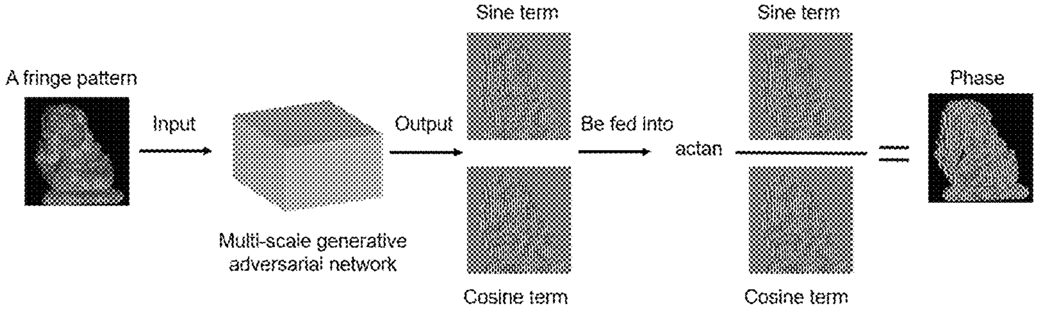
FIG. 1 is the flow chart of the present invention.

As shown in FIG. 1, the steps of the present invention are as follows:

Step 1: A multi-scale generative adversarial neural network model is constructed and it involves a multi-scale image generator and an image discriminator.

Further, the multi-scale image generator is used to generate the sine term, cosine term and modulation image with the original size of H×W.

Further, the input of the multi-scale image generator is the input fringe image and the fringe images downsampled by c.

Figure 2:
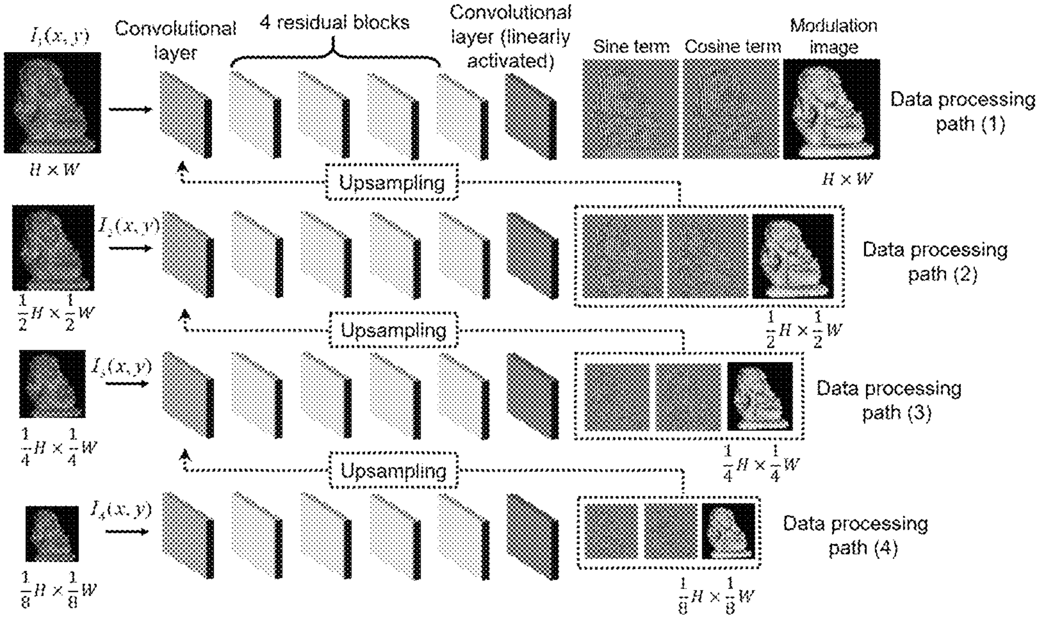
FIG. 2 is the diagram of the multi-scale image generator.

As shown in FIG. 2, in a further embodiment, the multi-scale image generator includes four data processing paths (1)-(4), which process the original input fringe image and the fringe images being downsampled by respectively. For convenience of description, the input fringe image is denoted as $I_1(x, y)$, and its size is H×W in pixel. The fringe image $I_1(x, y)$ is then downsampled to different degrees, generating the image $$I_2(x, y) \text{ of } \frac{1}{2}H \times \frac{1}{2}W,$$

the image $$I_3(x, y) \text{ of } \frac{1}{4}H \times \frac{1}{4}W,$$

and the image $$I_4(x, y) \text{ of } \frac{1}{8}H \times \frac{1}{8}W.$$

In some embodiments, the image pyramid method can be used to generate the above images.

As shown in FIG. 2, in a further embodiment, each data processing path has the same structure and consists of a convolutional layer, 4 residual blocks, and a convolutional layer that is linearly activated.

The input of the data processing path (4) is $I_4(x, y)$ whose image size is $$\frac{1}{8}H \times \frac{1}{8}W. I_4(x, y)$$

is processed by a convolutional layer, four residual blocks and a convolutional layer that is linearly activated, giving the sine term, cosine term and the modulation image of size $$\frac{1}{8}H \times \frac{1}{8}W.$$

The input of the data processing path (3) is $I_3(x, y)$ and the output of the data processing path (4) which includes the sine term, the cosine term and the modulation image and their size is upsampled to $$\frac{1}{4}H \times \frac{1}{4}W.$$

The input of the data processing path (2) is $I_2(x, y)$ and the output of the data processing path (3) which includes the sine term, the cosine term and the modulation image and their size is upsampled to $$\frac{1}{2}H \times \frac{1}{2}W.$$

The input of the data processing path (1) is $I_1(x, y)$ and the output of the data processing path (2) which includes the sine term, the cosine term and the modulation image and their size is upsampled to H×W. The output of the data processing path (1) is the estimated sine term, the cosine term and the modulation image that have the original size of H×W.

Figure 3:
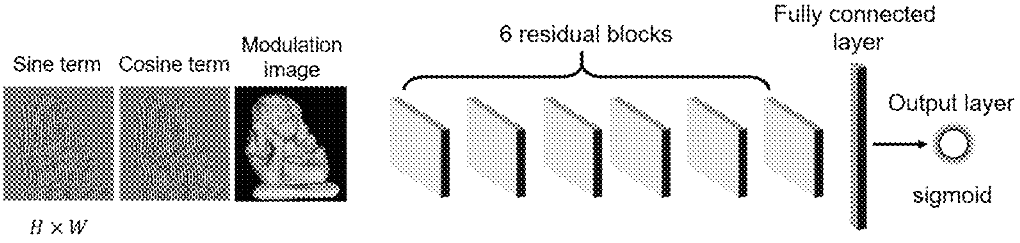
FIG. 3 is the diagram of the image discriminator.
Figure 4:
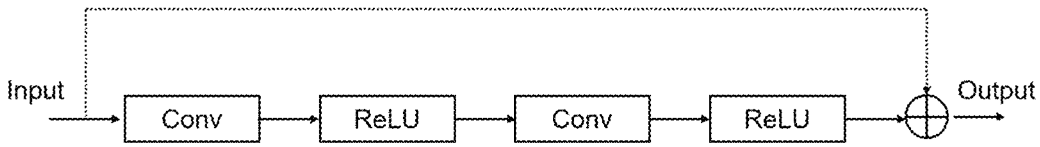
FIG. 4 is the diagram of the residual block.

As shown in FIG. 3, in a further embodiment, the mentioned image discriminator is built by 6 residual blocks and a fully connected layer. They are connected sequentially. The last fully connected layer is activated by the sigmoid function.

The input of the image discriminator includes two kinds of data whose image resolution is H×W. One type of data is the ground-truth sine term, cosine term and modulation image. They are calculated by high-accuracy standard methods, such as 7-step phase shift algorithm. The label of these ground-truth data is set to 1. The other type of data is the output of the multi-scale image generator, which is the estimated sine term, cosine term and modulation image. The label of these estimated data is set to 0.

Step 2: The comprehensive loss function L is constructed for the multi-scale generative adversarial network.

In a further embodiment, the mentioned comprehensive loss function L can be expressed as $$L = \alpha L_{image} + \beta L_{GAN}$$

where α and β are the weights, $L_{image}$ the loss function regarding the image content, and $L_{GAN}$ the adversarial loss function.

The image content loss $L_{image}$ is written as $$L_{image} = \gamma L_f + \eta L_m$$

where γ and η are the weights, $L_f$ represents the loss of the sine and cosine terms, $L_m$ the loss of the modulation image. $L_f$ can be expressed as $$L_f = \sum_{s=1}^{4} L_s^f$$

$$L_s^f = \frac{1}{H_s \times W_s}\left[\|G_{sin}^s - P_{sin}^s\|^2 + \|G_{cos}^s - P_{cos}^s\|^2\right]$$

where S represents the different scales of the multi-scale image generator. $L_f$ comprehensively calculates the sum of the errors of the output sine term and cosine term at four different scales. $H_s$ is the height of the image of the scale S, and $W_s$ is the width of the image of the scale S. G is the ground truth data and P the predicted results generated by the multi-scale image generator. The subscript sin indicates the sine term and the subscript cos indicates the cosine term.

The loss of the modulation image $L_m$ can be written as $$L_m = \sum_{s=1}^{4} L_s^m$$

$$L_s^m = \frac{1}{H_s \times W_s}\|G_{mod}^s - P_{mod}^s\|^2$$

where $L_m$ comprehensively calculated the sum of the errors of the output modulation image at four different scales. The subscript mod indicates the modulation image.

The adversarial loss function $L_{GAN}$ is $$L_{GAN} = \underset{T\sim p(T)}{E}[\log d(T)] + \underset{I\sim p(I)}{E}[\log(1 - d(g(I)))]$$

where E represents the expectation. I is the input fringe image. T is the ground-truth data, which are the ground-truth sine term, cosine term, modulation degree diagram corresponding to the input fringe image. p represents the probability distribution. g represents the multi-scale image generator. g(I) are the estimated sine term, cosine term, modulation degree diagram by the multi-scale image generator. d is the image discriminator.

Step 3: The training data are collected to train the multi-scale generative adversarial network.

Measuring the fringe images of v different scenes, and taking 7 phase-shifting fringe images for each scene. The acquired fringe images are expressed as $I_t(x, y)$ (t=1, 2 . . . K, K=7v is the total number of acquired fringe images).

Using the 7-step phase-shifting algorithm (Bruning, J. Herriot, Donald R. Herriott, Joseph E. Gallagher, Daniel P. Rosenfeld, Andrew D. White, and Donald J. Brangaccio. "Digital wavefront measuring interferometer for testing optical surfaces and lenses." Applied optics 13, no. 11 (1974): 2693-2703), the ground-truth sine term, cosine term, and modulation image corresponding to the fringe image is calculated.

Then, feeding the fringe image $I_t(x, y)$ into the multi-scale image generator and estimating the sine term, cosine term and modulation image with size of H×W.

The image discriminator alternately extracts a group of sine term, cosine term and modulation image from the ground-truth dataset and the dataset generated by the multi-scale image generator as input. The input data are then successively passes through six residual blocks and a fully connected layer. Finally, the data pass through the sigmoid activation function and outputs a probability value between 0 and 1. The significance of the image discriminator is to learn how to distinguish the group of ground-truth sine term, cosine term and modulation image (labeled as 1) from the group output by the image generator (labeled as 0) through training. During training, the multi-scale image generator can generate sine terms, cosine terms and modulation image with higher fidelity until the adversarial loss is close to a preset threshold. At this moment, these estimated data can "fool" the image discriminator.

In some embodiments, 80% of the collected training data is used for training, and the remaining 20% of the data is used for verification. Specific training implementation can be carried out by referring works such as Isola, Phillip, Jun-Yan Zhu, Tinghui Zhou, and Alexei A. Efros. "Image-to-image translation with conditional adversarial networks." In Proceedings of the IEEE conference on computer vision and pattern recognition, pp. 1125-1134. 2017 and Goodfellow, Ian, Jean Pouget-Abadie, Mehdi Mirza, Bing Xu, David Warde-Farley, Sherjil Ozair, Aaron Courville, and Yoshua Bengio. "Generative adversarial networks." Communications of the ACM 63, no. 11 (2020): 139-144.

Step 4: When the multi-scale generative adversarial network is trained, a fringe image is fed into the image generator. It outputs the sine term M(x, y), cosine term D(x, y), and modulation image B(x, y). The sine term M(x, y) and cosine term D(x, y) are substituted into the arctangent function to calculate the phase $\phi(x, y)$:

$$\phi(x, y) = \arctan\frac{M(x, y)}{D(x, y)}$$

Since the input of the neural network is only a single fringe pattern, the invention provides an efficient and high-precision phase calculation method for moving objects.

EXAMPLE

In order to verify the effectiveness of the present invention, a fringe projection 3D measurement system is constructed with a camera (model aca640-750, Basler), a projector (model LightCrafter 4500, Ti), and a computer. Firstly, the multi-scale generative adversarial network is constructed by using the steps 1 and 2. Secondly, the training data collected in step 3 are used to train the multi-scale generative adversarial network. In this embodiment, v=150 different scenarios are selected, and 1050 training fringe images $I_t(x, y)$ are taken by using the 7-step phase-shifting method (t=1, 2, . . . , 1050). The 7-step phase-shifting method is used to generate ground-truth sine term $M_t(x, y)$, cosine term $D_t(x, y)$, modulation image $B_t(x, y)$ for each $I_t(x, y)$.

Figure 5:
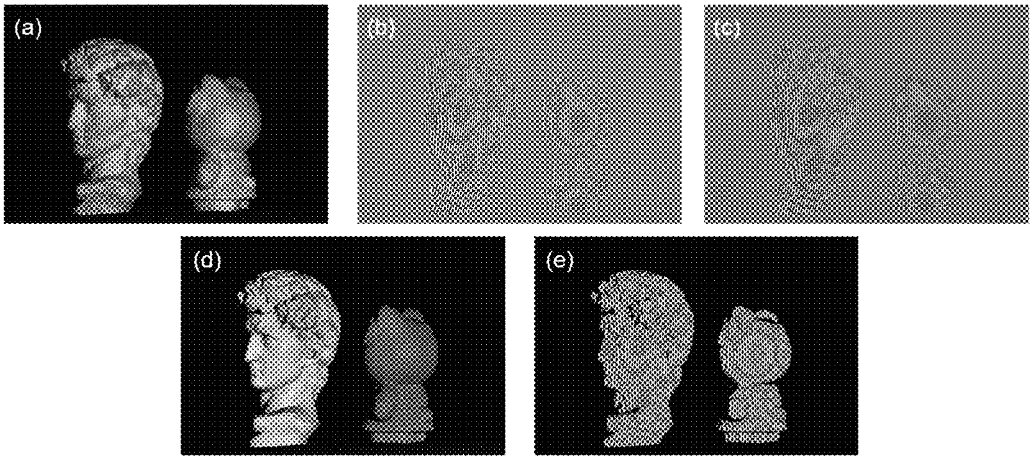
FIG. 5 shows some results of the invention. (a) The fringe pattern that is the input to the trained network. (b) The output sine term. (c) The output cosine term. (d) The output modulation image. (e) The phase calculated by substituting (b) and (c) into the arctangent function.

When the neural network is trained, an unseen scene is measured. The fringe image of this scene is shown in FIG. 5 (*a*). The fringe image is fed into the image generator of the multi-scale generative adversarial network and obtain the sine term (FIG. 5 (*b*)), cosine term (FIG. 5 (*c*)), and modulation image (FIG. 5 (*d*)). The sine term and cosine term are substituted into the arctangent function to calculate the phase that is shown in FIG. 5 (*e*).

Figure 6:
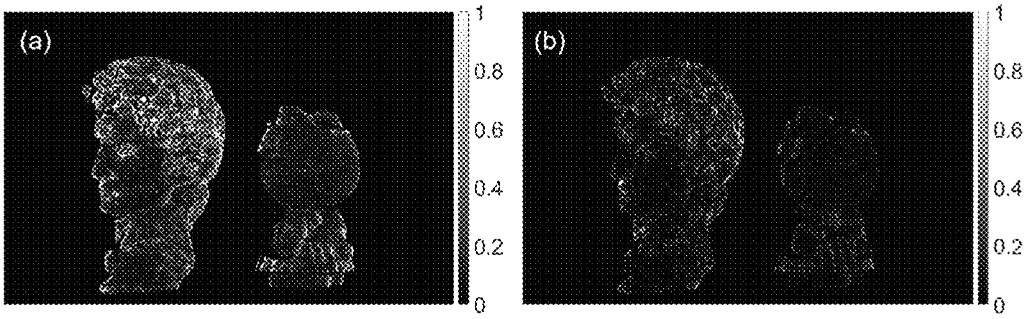
FIG. 6 shows the absolute phase error of (a) Fourier transform fringe image analysis and (b) the present invention.

In order to quantify the phase measurement accuracy of the present invention, the fringe image (FIG. 5 (*a*)) is also analyzed by the Fourier transform fringe analysis method. Taking the phase calculated by the 7-step phase-shifting method as the reference, FIG. 6 (*a*) shows the absolute phase error distribution of Fourier transform method, and FIG. 6 (*b*) shows the absolute phase error distribution of the present invention. The brightness of the gray value corresponds to the magnitude of the phase error. According to the results of the error distribution, it can be seen that the present invention can calculate the phase of complex surfaces (such as the hair of the left model) with higher accuracy. Finally, the average absolute phase error of the whole scene is compared. The error of the Fourier transform fringe analysis is 0.24 rad, while the error of present invention is 0.091 rad. This embodiment shows that as a single-frame fringe analysis method, the phase accuracy of the present invention is higher than that of the traditional Fourier transform fringe analysis.

The invention claimed is:

1. A single-frame fringe pattern analysis method based on multi-scale generative adversarial network, comprising the steps of:

constructing a multi-scale generative adversarial neural network model including a multi-scale image generator and an image discriminator;

constructing a comprehensive loss function L for the multi-scale generative adversarial neural network;

collecting training data to train the multi-scale generative adversarial network;

feeding a single fringe pattern into the trained multi-scale network during prediction, wherein the multi-scale image generator outputs a sine term, a cosine term, and a modulation image of an input pattern; and applying an arctangent function to compute a phase using the sine term and the cosine term, wherein the multi-scale image generator comprises four data processing paths including data processing path (1), data processing path (2), data processing path (3) and data processing path (4) with a same structure, wherein:

an input of the data processing path (4) is $I_4(x, y)$ with an image size of $$\frac{1}{8}H\times\frac{1}{8}W;$$

an input of the data processing path (3) includes $I_3(x, y)$ and an output of the data processing path (4) comprising a sine term, a cosine term and a modulation image upsampled to a size of $$\frac{1}{4}H\times\frac{1}{4}W;$$

an input of data processing path (2) includes $I_2(x, y)$ and an output of the data processing path (3) comprising a sine term, a cosine term and a modulation image upsampled to a size of $$\frac{1}{2}H\times\frac{1}{2}W;$$

an input of data processing path (1) includes $I_1(x, y)$ and an output of the data processing path (2) comprising a sine term, a cosine term and a modulation image upsampled to a size of H×W.

2. The method of claim 1, wherein each data processing path consists of a convolutional layer, 4 residual blocks, and a convolutional layer that is linearly activated.

3. The method of claim 2, wherein the comprehensive loss function L is expressed as:

$$L=\alpha L_{image}+\beta L_{GAN},$$

where α and β are weights, $L_{image}$ is the loss function regarding an image content, and $L_{GAN}$ is an adversarial loss function.

4. The method of claim 1, wherein the image discriminator comprises six residual blocks and a fully connected layer connected sequentially, and wherein the fully connected layer is activated by a sigmoid function.

5. The method of claim 4, wherein the comprehensive loss function L is expressed as:

$$L=\alpha L_{image}+\beta L_{GAN},$$

where α and β are weights, $L_{image}$ is the loss function regarding an image content, and $L_{GAN}$ is an adversarial loss function.

6. The method of claim 1, wherein the comprehensive loss function L is expressed as:

$$L=\alpha L_{image}+\beta L_{GAN},$$

where α and β are weights, $L_{image}$ is the loss function regarding an image content, and $L_{GAN}$ is an adversarial loss function.

7. The method of claim 6, wherein the image content loss $L_{image}$ is expressed as:

$$L_{image}=\gamma L_f+\eta L_m,$$

where γ and η are weights, $L_f$ represents loss of sine and cosine terms, $L_m$ represents loss of the modulation image.

8. The method of claim 7, wherein the loss of the sine and cosine terms $L_f$ is expressed as:

$$L_f=\sum_{s=1}^{4}L_s^f,\text{ and }L_s^f=\frac{1}{H_s\times W_s}\left[\|G_{sin}^s-P_{sin}^s\|^2+\|G_{cos}^s-P_{cos}^s\|^2\right],$$

where S represents different scales of the multi-scale image generator; $L_f$ calculates a sum of errors of output sine term and cosine term at four different scales; $H_s$ is a height of the image at the scale S, and $W_s$ is a width of the image at the scale S; G is a ground truth data and P represents predicted results generated by the multi-scale image generator; subscript sin indicates sine term and subscript cos indicates cosine term, and wherein the loss of the modulation image $L_m$ is written as:

$$L_m=\sum_{s=1}^{4}L_s^m,\text{ and }L_s^m=\frac{1}{H_s\times W_s}\|G_{mod}^s-P_{mod}^s\|^2,$$

where subscript mod indicates the modulation image.

9. The method of claim 6, the adversarial loss function $L_{GAN}$ is expressed as:

$$L_{GAN}=\underset{T\sim p(T)}{E}[\log d(T)]+\underset{I\sim p(I)}{E}[\log(1-d(g(I)))],$$

where E represents expectation; I is an input fringe image; T is a ground-truth data comprising ground-truth sine term, cosine term, and modulation degree diagram corresponding to the input fringe image; p represents probability distribution; g represents the multi-scale image generator; g(I) represents estimated sine term, cosine term, modulation degree diagram by the multi-scale image generator; and d is the image discriminator.

10. The method of claim 1, wherein the step of collecting training data to train the multi-scale generative adversarial network comprises the steps of:

measuring fringe images $I_t(x, y)$ of v different scenes, and taking seven phase-shifting fringe images for each scene;

calculating a ground-truth sine term $M_t(x, y)$, a ground-truth cosine term $D_t(x, y)$, and a ground-truth modulation image $B_t(x, y)$ with a 7-step phase-shifting method;

feeding the fringe image $I_t(x, y)$ into the multi-scale image generator to output the sine term M(x, y), cosine term D(x, y), and modulation image B(x, y);

inputting to the image discriminator a group of sine terms, cosine terms, and modulation images alternately extracted from a ground-truth dataset and a dataset generated by the multi-scale image generator; and outputting a probability value between 0 and 1 from the image discriminator, wherein the training process terminates when an adversarial loss reaches a preset threshold.

11. The method of claim 10, wherein the phase calculation comprises substituting the estimated sine term M(x, y) and cosine term D(x, y) into the arctangent function to obtain a phase $\phi(x, y)$ according to a formula of $$\phi(x, y) = \arctan\frac{M(x, y)}{D(x, y)}.$$

* * * * *